United States Patent [19]

Harbers, Jr.

[11] Patent Number: 4,889,981

[45] Date of Patent: Dec. 26, 1989

[54] MANUALLY ACTUABLE, MACHINE READABLE MENU CARD WITH RIB CONTROLLED BUBBLES

[75] Inventor: H. C. Harbers, Jr., Templeton, Calif.

[73] Assignee: Escorp, Inc., San Luis Obispo, Calif.

[21] Appl. No.: 270,827

[22] Filed: Nov. 14, 1988

Related U.S. Application Data

[63] Continuation-in-part of Ser. No. 149,492, Jan. 28, 1988, Pat. No. 4,812,630, which is a continuation-in-part of Ser. No. 916,942, Oct. 8, 1986, Pat. No. 4,808,805.

[51] Int. Cl.[4] .................... G06K 19/06

[52] U.S. Cl. .................... 235/490; 235/487

[58] Field of Search .................... 235/490, 487, 448

[56] References Cited

U.S. PATENT DOCUMENTS 2,453,239 11/1948 Luhn .
2,507,307 5/1950 Josephy .
2,746,679 5/1956 Stratton et al. .
3,095,502 6/1963 Sikora .
3,441,714 4/1969 Simjian .
3,510,848 5/1980 Becker et al. .
3,634,853 1/1972 Hedges .
3,637,989 1/1972 Howard et al. .
3,686,480 8/1972 Bowerman .
3,688,087 8/1972 Howard et al. .
3,737,631 6/1973 Harris .
3,854,035 12/1974 Tyler et al. .
3,868,652 2/1975 Copper et al. .
3,916,159 10/1975 del Castillo .
3,934,242 1/1976 Mueller .
3,937,453 2/1976 Hickey et al. .
3,937,929 2/1976 Knauer .
3,986,030 10/1976 Teltscher .
4,128,757 12/1978 Garner, Jr. .
4,180,204 12/1979 Koenig et al. .
4,310,897 1/1982 Lazzari .
4,313,108 1/1982 Yoshida .
4,363,584 12/1982 Kokubo .
4,369,361 1/1983 Swartz et al. .
4,467,321 8/1984 Volnak .
4,516,016 5/1985 Kodron .
4,664,418 5/1987 Bear .
4,808,805 2/1989 Harbers .................... 235/490

FOREIGN PATENT DOCUMENTS 759591 4/1971 Belgium .
750179 5/1944 Fed. Rep. of Germany .
2046040 3/1972 Fed. Rep. of Germany .
2234935 1/1974 Fed. Rep. of Germany .

*Primary Examiner*—Harold I. Pitts
*Attorney, Agent, or Firm*—William W. Haefliger

[57] ABSTRACT

A menu device comprises
(a) a card,
(b) indicia on the card listing items to be selected,
(c) bubbles on the card in alignment with the indicia, the bubbles having positions on the card representative of items to be selected,
(d) the bubbles having first positions projecting in one direction outwardly from the plane of the card, and second positions into which they are displaced relative to the plane of the card, by finger pressure, to indicate selection of items corresponding to bubble positions on the card,
(e) the bubbles have integral local ribbing for bubble displacement control.

28 Claims, 7 Drawing Sheets

FIG. 3.
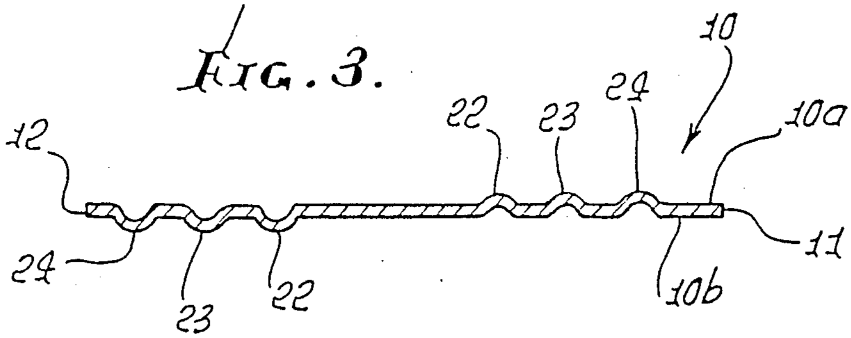
FIG. 4.
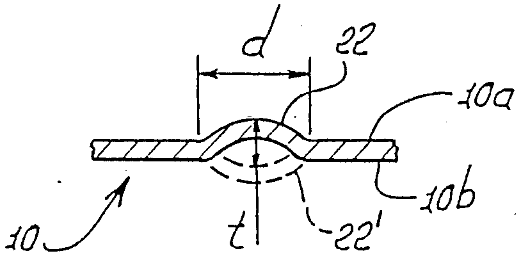
FIG. 5.
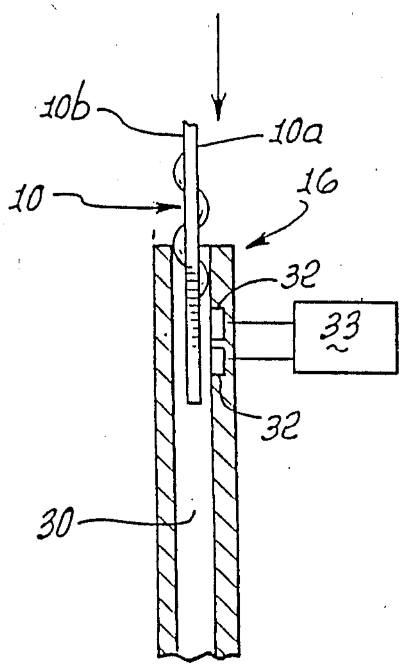
FIG. 9.
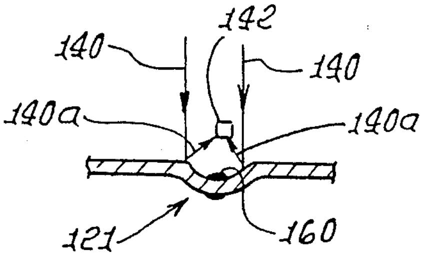
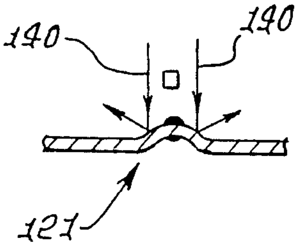
FIG. 10.

MANUALLY ACTUABLE, MACHINE READABLE MENU CARD WITH RIB CONTROLLED BUBBLES

BACKGROUND OF THE INVENTION

This application is a continuation-in-part of Ser. No. 149,492 filed Jan. 28, 1988, now U.S. Pat. No. 4,812,630, which is a continuation-in-part of Ser. No. 916,942, filed Oct. 8, 1986, now U.S. Pat. No. 4,808,805.

This invention relates generally to the selecting and filling of orders, and more particularly to a very simple, re-usable card on which orders can be entered, and which is readable by a machine, or by human eye, to fill orders.

There is need, as for example at fast food take-out establishment, or other order-receiving establishment for means to enable rapid conversion of desired orders into groupings ready to be taken out or shipped. A major problem is the time required for the order giver to think through and remember what he desires, as he attempts to quickly convey this information to a clerk. Order changes are frequent as the order giver attempts to state items and/or number of items to the clerk, while he re-thinks his desires and the desires of others accompanying him or her, at the establishment. There is a great deal of time wasted, and the order filling process is slowed, to the inconvenience of those waiting in line to have their orders filled. There is need for means or system that obviates these and similar problems, including the need for a quickly programmable and re-programmable menu device.

SUMMARY OF THE INVENTION

It is a major object of the invention to provide a solution to the above problems, and difficulties, through provision of a menu ordering device easily usable to pre-select total orders of a large number of possible items of merchandise, and enabling changing of item selection, and without requiring a pen or pencil, or permanent deformation, of the device.

Basically, the device comprises:

(a) a card, (b) indicia on the card listing items to be selected, (c) bubbles on the card and generally in alignment with the indicia, the bubbles having positions on the card representative of items or numbers of items or other item data selected, (d) the bubbles having first positions projecting in one direction outwardly from the plane of the card, and second positions into which they are displaced relative to the plane of the card, by finger pressure, to indicate selection of items corresponding to bubble positions on the card, (e) the bubbles have integral local ribbing for bubble displacement control.

Such ribbing acts to stiffen the displaced bubbles for resisting their return to first position during manual manipulation of the card to displace other bubbles; and in this regard, the card is typically somewhat flexible. As will appear, the bubbles have crests and said ribbing is offset from said crests; and the ribbing may extend toward the crests, as in a Y-shape for example.

A further object of the invention is to provide a card that extends laterally and longitudinally, certain bubbles extending at one lateral side of the indicia, and other bubbles extend at the opposite lateral side of the indicia, the certain bubbles domed downwardly, and the other bubbles domed upwardly In this regard, the card typically has opposite faces, the indicia including certain indicia readable at one face of the card and other indicia readable at the opposite face of the card, and wherein certain bubbles associated with said certain indicia are domed downwardly relative to said one face, and wherein other bubbles associated with said other indicia are domed downwardly relative to said opposite face, when viewed.

The method of using the card device includes selecting indicia at one face of the card, and then:

(i) visually reading said indicia to determine which of said items are to be selected, (ii) and manually upwardly displacing a selected bubble or bubbles in alignment with selected said items, the selected bubble or bubbles corresponding to the desired selected items.

These and other objects and advantages of the invention, as well as the details of an illustrative embodiment, will be more fully understood from the following specification and drawings, in which:

DRAWING DESCRIPTION

FIG. 3 is a section taken on lines 3—3 of FIG. 1;

FIG. 4 is an enlarged section showing bubble construction and multiple portions; and FIG. 5 is a vertical section showing bubble sensor means;

FIGS. 9 and 10 show bubble reading;

Figure 11:
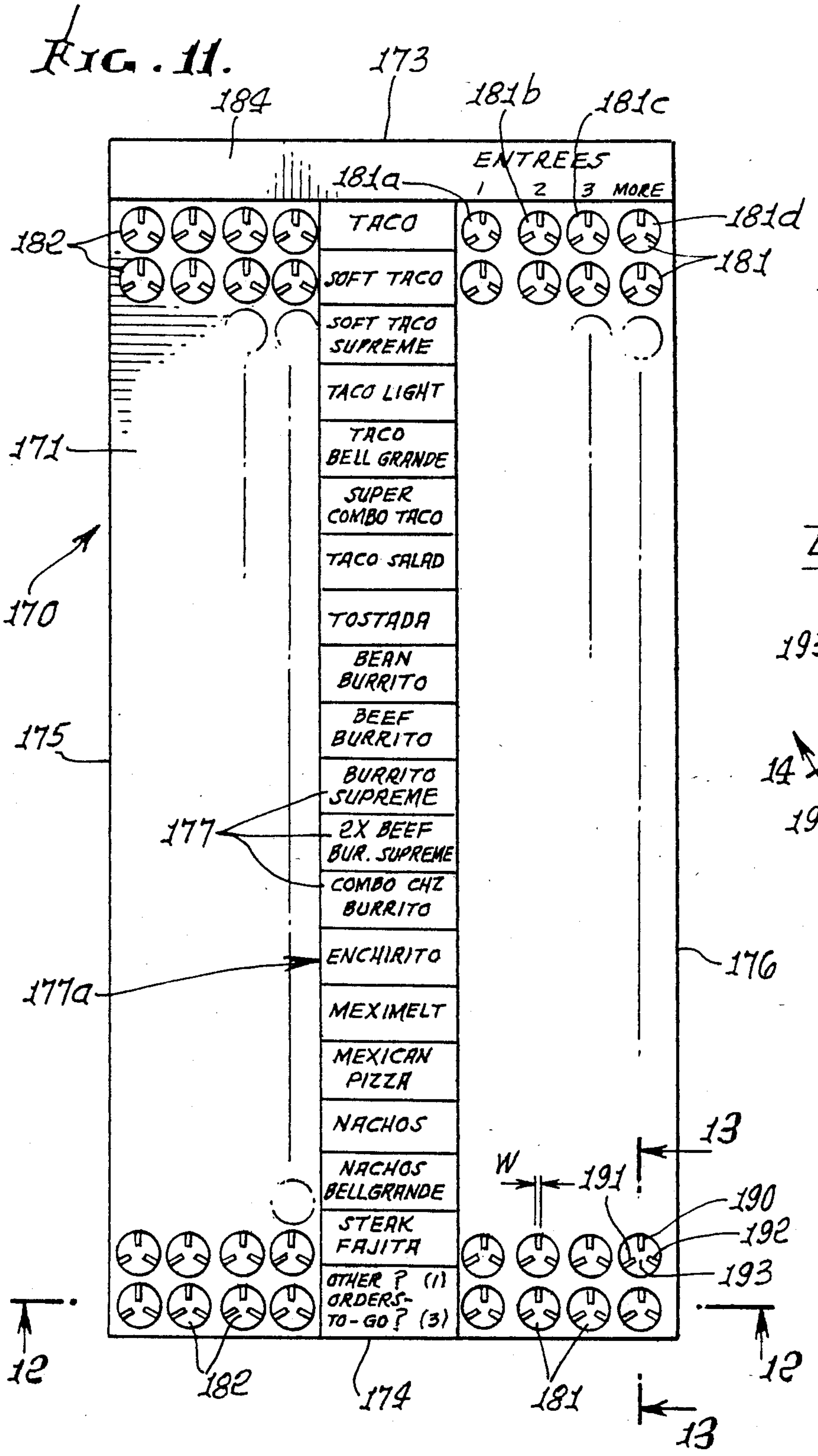
Figure 13:
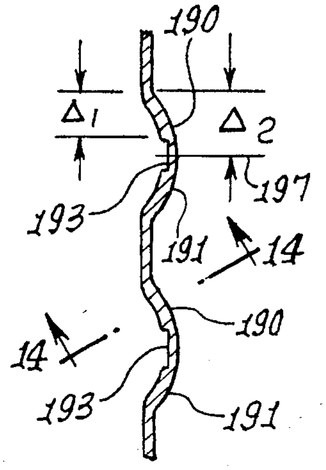
Figure 12:
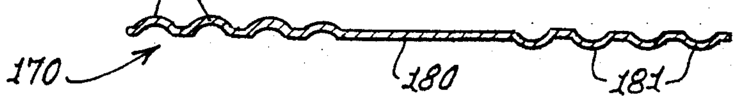
Figure 14:
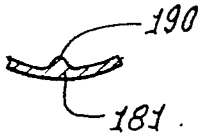

FIGS. 11 and **11*a*** show opposite faces of a modified card;

FIG. 12 is a section taken on lines 12—12 of FIG. 11;

FIG. 13 is an enlarged section taken on lines 13—13 of FIG. 11;

FIG. 14 is a section taken on lines 14—14 of FIG. 13; and

Figure 15:
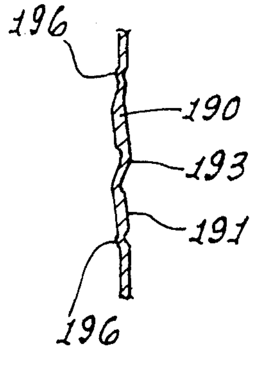

FIG. 15 is a view like FIG. 13 showing a displaced bubble.

DETAILED DESCRIPTION

In the drawings, a card 10 is typically rectangular and has opposite faces **10*a* and 10*b*, and edges 11-14. As shown, the card is vertically elongated to bear multiple horizontal rows 15** of the indicia, in a column, as for example at least ten rows, but it may have other forms and shapes. It may be foldable, and bendable, and it is peripherally sized to fit vertically in a shirt or pants pocket so that a customer may conveniently carry it to a store to obtain items or merchandise pre-selected on the card.

Figure 1:
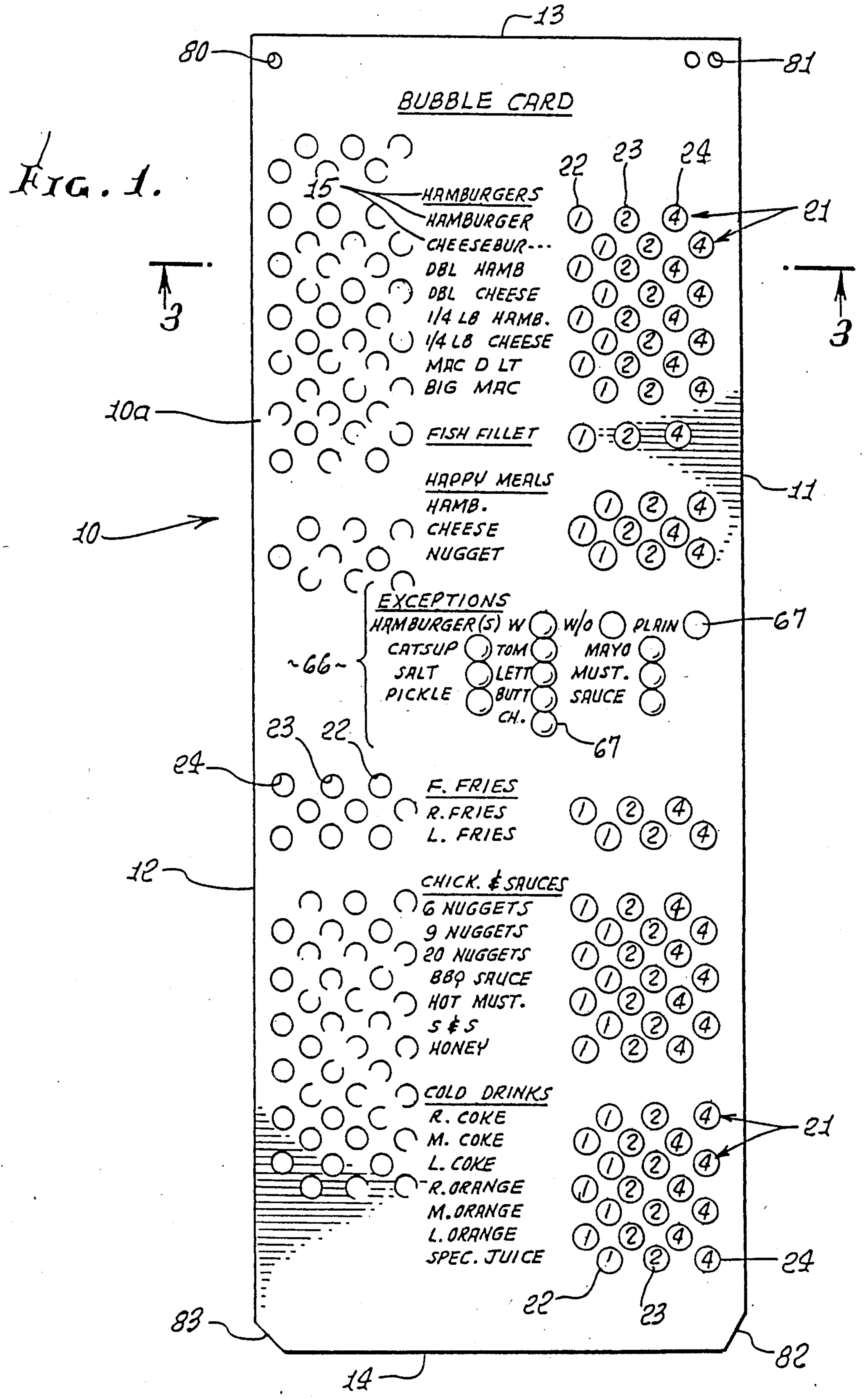
FIG. 1 is a plan view of a card incorporating the invention.
Figure 2:
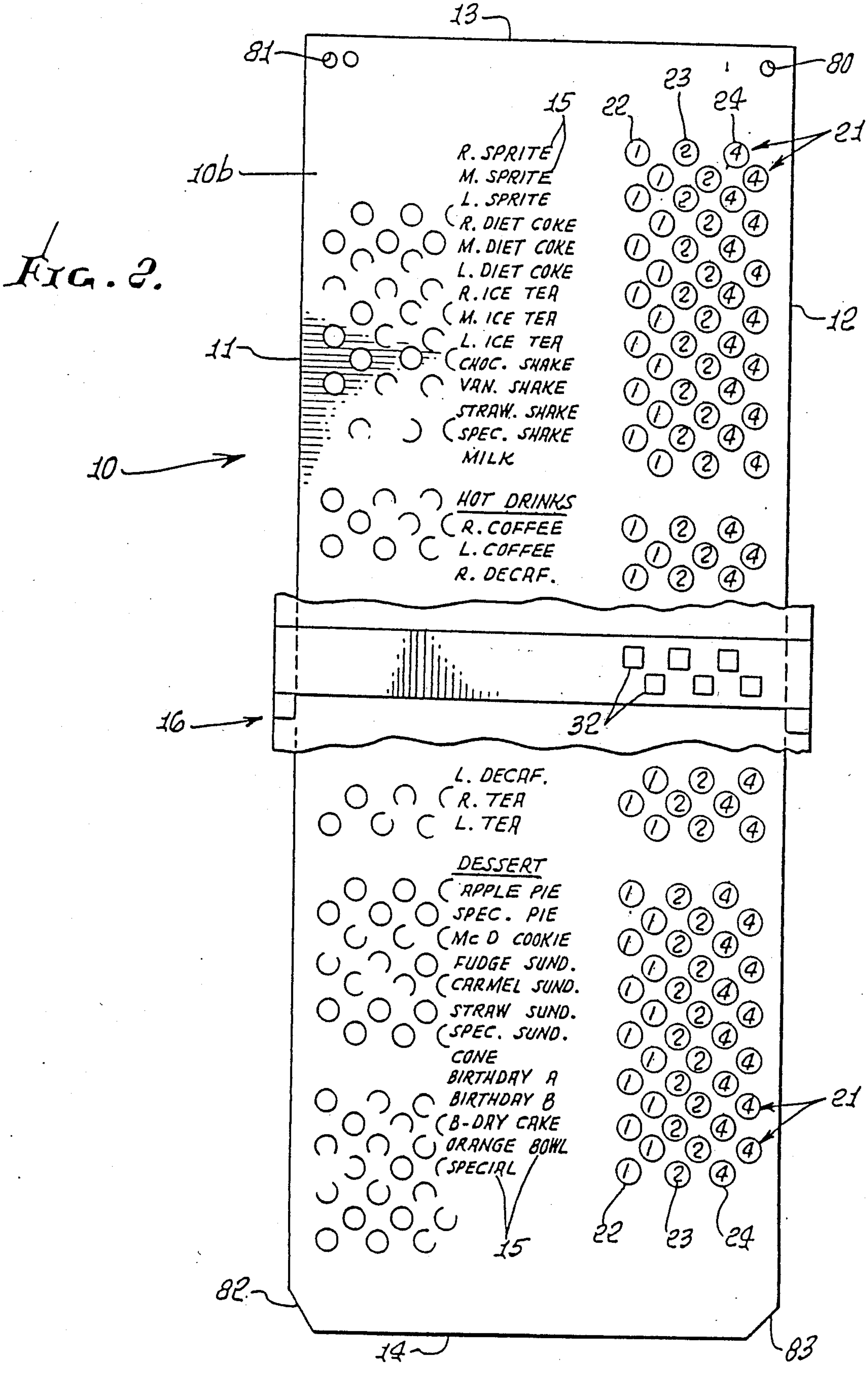
FIG. 2 is a plan view of the back side of the FIG. 1 card (or similar card) incorporating the invention, together with associated bubble sensor apparatus.

Each row of indicia typically indicates an item of merchandise to be selected by the said bearer, and to be detected by a device 16 into which the card is removably receivable, as at the store, the latter for example being represented by a fast food take-out establishment. Thus, the items of merchandise to be selected may include fast food items, as are indicated in FIGS. 1 and 2; however, other items to be selected may appear on the card.

Rows 21 of bubbles are located on the card in horizontal alignment with the rows of indicia, the bubbles having positions on the card representative of numbers of items to be selected. Preferably, there are at least three bubbles 22, 23 and 24 in each row, the three bubbles as shown representing the numbers 1, 2 and 4 of the same items, so that up to seven such items may be selected merely by manipulating one or more of the three bubbles As shown, a typical bubble 22 has a first stable position (see full lines in FIG. 4) projecting upwardly from the plane of the card, and a second stable position 22' into which it is displaced, relative to the plane of the card, by finger pressure, in order to indicate selection of an associated number or numbers of the selected items to be ordered. Thus, if a bubble 22 in the first column is displaced to position 22', one such item is to be ordered; if a bubble 23 in the second column is displaced to a position corresponding to 22', two such items are to be ordered; and if the bubble 24 in the third column is similarly displaced, four such items are to be ordered. The possible configurations are:

| | Items to be Ordered |
|---|---|
| Displaced bubble 22 | 1 |
| Displaced bubble 23 | 2 |
| Displaced bubbles 22 and 23 | 3 |
| Displaced bubble 24 | 4 |
| Displaced bubbles 24 & 22 | 5 |
| Displaced bubbles 23 & 24 | 6 |
| Displaced bubbles 22, 23, & 24 | 7 |

Of advantage is the fact that the bubble may be returned to original (up) position, so that one can adjust and re-adjust his total order prior to presenting the card to the bubble "reader" (detector) at the store; and the card is therefore re-usable after it has been "read" at the store, i.e. the user can take it with him for leisurely selection of items to be ordered, as at his home, followed by re-presentation to the card reader at the store for instant reading of the total order. Also, the store clerk can use the card for order filling checkout, i.e. as the items of merchandise or fast food are assembled on a counter, the corresponding displaced bubbles are returned to initial position by finger pressure on them at the reverse side of the card, where the bubbles project outwardly (from the plane of the card, at that reverse side). To assist in this process, the reverse side of the card may bear rows of indicia the same as or similar to the indicia on the front side of the card, so that the clerk can maintain the card in turned-over state and press the displaced bubbles at that reverse side while reading corresponding indicia on the reverse side, as the items are assembled.

The card may advantageously consist of polystyrene so that the bubbles formed integrally with the card, as a one-piece suit, have flexible displaceability between two stable states as described. In order that at least 10 rows of such bubbles and indicia can be assembled on a menu card the bubbles typically have diameter "d" less than ⅜ inch, and such diameter should not be less than 3/16 inch to enable user finger displacement. Also the bubbles should undergo displacement "t" between stable states, where "t" exceeds twice the card (and bubble) thickness. Card thickness is desirably between 0.003 and 0.009 inch, for desired card flexibility, and bubble displaceability between states FIGS. 2 and 5 show a card reader 16 defining a slot 30 into which a card is received during bubble reading or detecting. Proximity or other type detectors are shown at 32, to read the presence of displaced bubbles as the card travels endwise in the slot. Box 33 represents a circuit connected with the detectors 32 connected to convert the detector signals corresponding to displaced bubbles into other signals such as numbers on a display seen by the clerk to enable assembly of the correct numbers of selected items. The reader and detector can take many different forms.

It will be noted that successive rows of bubbles in the column are staggered. This allows greater vertical concentration of bubbles, while maintaining distances or gaps between the bubbles in successive rows, required by the reader.

Also, "1" bubbles can have one color, "2" bubbles another color, and "4" bubbles a third color, to aid in bubble selection to correspond to numbers of items desired.

Referring again to FIG. 1, area 66 incorporates "exceptions" to the other items on the card; i.e., each listed item (catsup, etc.) in area 66 has associated with it only one bubble, as at 67 for example, since only one order of that item is made. Such bubbles 67 are of the same configuration and operation as the bubbles described above.

With reference to FIG. 2, the rear side of the card shows a second column of bubbles 21, to the right of the additional rows of indicia 15, complementing those indicia shown in FIG. 1. Maximum use of space on the card is thereby made, by having the indicia in a central column on each side of the card, and bubbles in a column to the right of the indicia column. Staggering of bubbles, as shown, adds further to space utilization, since it enables vertical condensation of the indicia rows. To the left of the indicia column on each side appear the rear sides of the bubbles that are associated with indicia on the opposite side of the card.

Associated with corners of the cards are means (bevels, of different angularity, or holes) that are detectable by the sensor apparatus to orient the sensor circuitry to the card orientation, as inserted into the sensor. Thus, either end of the card may be inserted into the sensor, and the card may face up or down. See holes 80 and 81, and beads 82 and 83.

Figure 6:
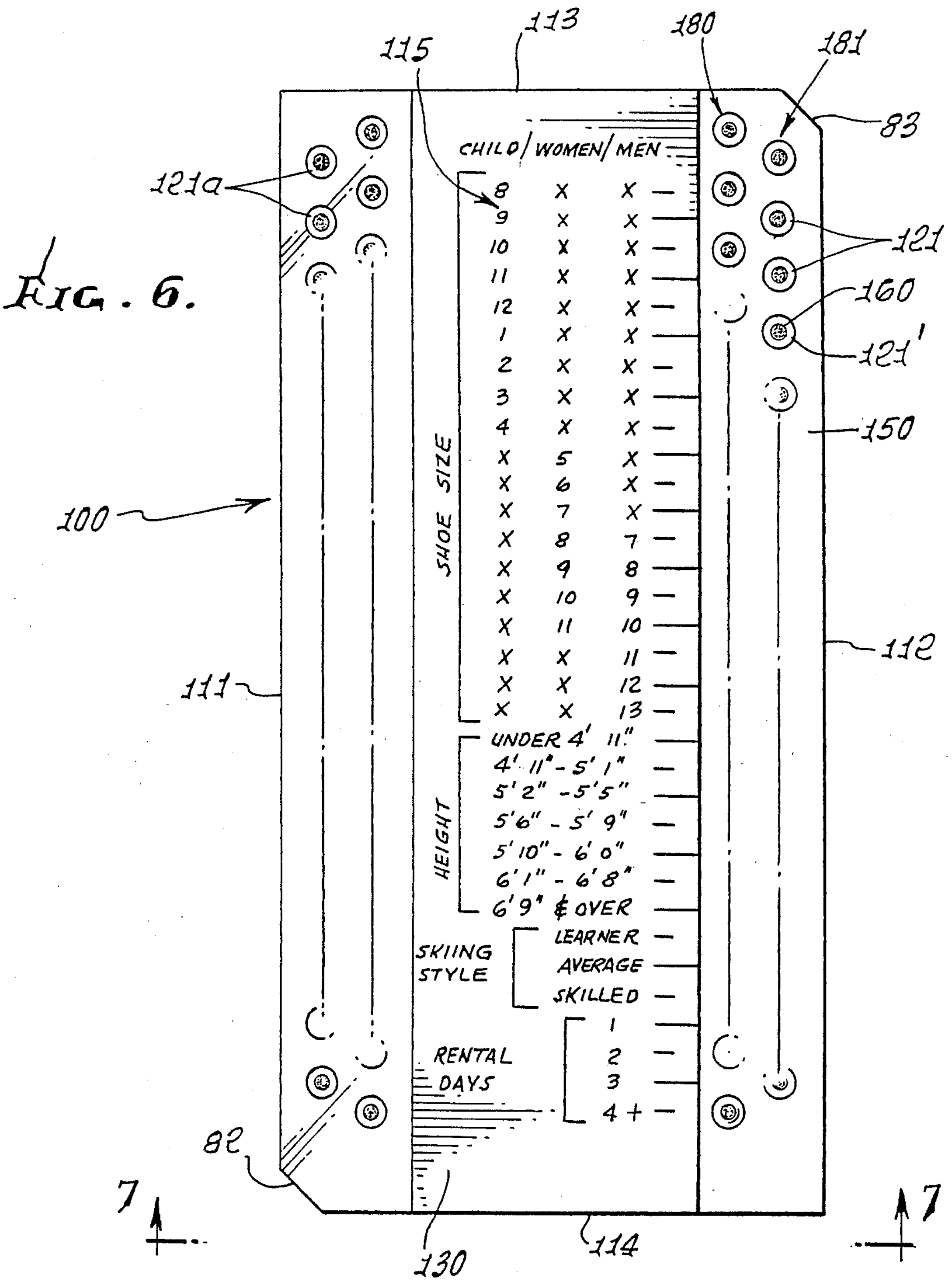
FIG. 6 is a plan view of a modified card.
Figure 7:
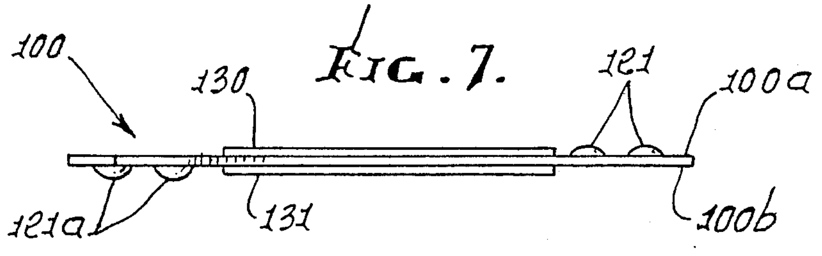
FIG. 7 is an edge view of lines 7—7 of FIG. 6.
Figure 8:
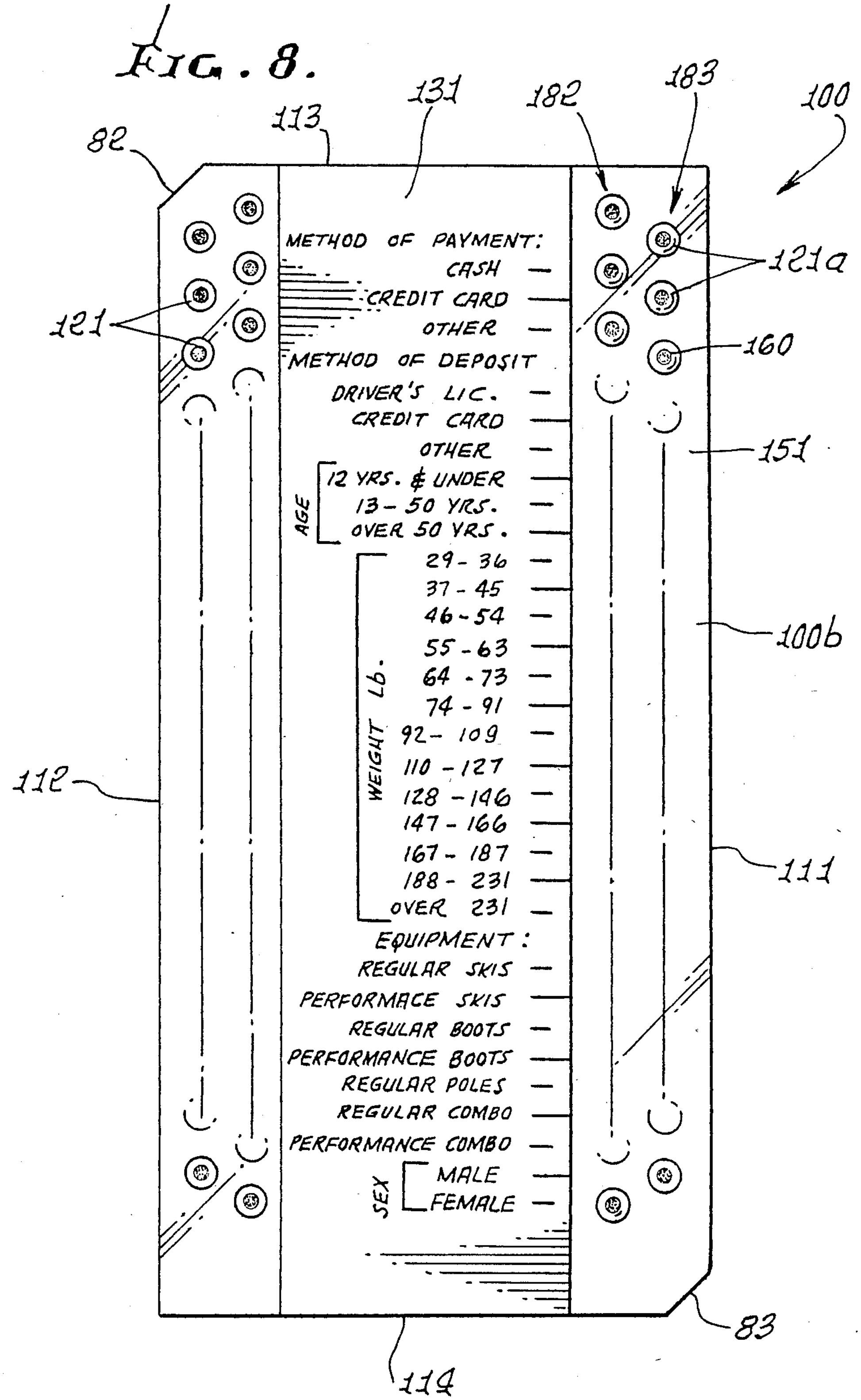
FIG. 8 is a plan view of the back side of the FIG. 6 card.

In FIGS. 6–8, a modified card 100 is typically rectangular and has opposite faces 100*a* and 100*b*, and edges 111–114. As shown, the card is vertically elongated to bear multiple horizontal rows 115 of indicia, in a column, as for example at least ten rows but it may have other forms and shapes. It may be foldable, and bendable, and it is peripherally sized to fit vertically in a shirt or pants pocket so that a customer may conveniently carry it to a store to obtain items of merchandise preselected on the card. The indicia are on thin labels 130 and 131 bonded to opposite sides of the card, the card typically being formed of transparent plastic material, which is flexible, and the thin labels, typically of paper, stiffen the card for ease and accuracy of handling and bubble selection.

Each row of indicia typically indicates an item of merchandise, and/or its size, to be selected by the said bearer, and/or terms of payment, or other information regarding such items See the representative items listed on the two labels, and in column sequence.

Bubbles 121 are located on the card to the right of, and in horizontal alignment with the rows of indicia, the bubbles having positions on the card representative of items, or numbers of items to be selected. Two columns 180 and 181 of bubbles are shown, the bubbles staggered, as illustrated.

A typical bubble 121' has a first stable position (as previously described for bubbles 22) projecting downwardly from the plane of the card, and a second and upward stable position into which it may be displaced, relative to the plane of the card, by finger pressure, in order to indicate selection of an item size or other associated date.

Of advantage is the fact that the bubble may be returned to original (down) position, so that one can adjust and re-adjust his total order prior to presenting the card to the bubble "reader" (detector), as at the store; or other location and the card is therefore re-usable after it has been "read", i.e. the user can taken it with him for leisurely pre-selection of items to be ordered, as at his home, followed by representation to the card reader at the store for instant reading of the total order. Also, the store clerk can use the card for order filling checkout, i.e. as the items of merchandise or fast food are assembled on a counter, the corresponding displaced bubbles are returned to initial position by finger pressure run along the reverse side of the card, where the bubbles project outwardly (from the plane of the card, at that reverse side). As the card section is run between the user's thumb (on the upper side), and first two fingers (on the lower side), the section flexes to an extent that bubbles are restored to first state. Thus, the device is an erasable, flexible, re-programmable, keyboard. The reverse side of the card may bear other rows of indicia as on label 131, and rows 182 and 183 of bubbles **121*a* (like bubbles in rows 180 and 181) are formed to the right of the indicia on label 131**, in horizontal alignment with that indicia, as shown. Bubble manipulation is the same as described above.

The card transparent section or sections (forming the bubbles) may advantageously consist of polystrene so that the bubbles formed integrally with the card, as a one-piece unit, have flexible displaceability between two stable states as described.

The card sections 150 to the right of label 30 in FIG. 6, and 151 to the right of label 131 in FIG. 8, are transparent. In order that at least 10 rows of such bubbles and indicia can be assembled on a menu card, the bubbles typically have diameter "d" less than ⅜ inch, and such diameter should not be less than 3/16 inch to enable user finger displacement. Also the bubbles should undergo displacement "t" between stable states, where "t" exceeds twice the card (and bubble) thickness. Card thickness is desirably between 0.003 and 0.009 inch, for desired card flexibility, and bubble displaceability between states.

The FIGS. 6–8 card may be read by the card reader 16 defining a slot 30 into which a card is received during bubble reading or detecting. Proximity or other type detectors are shown at 32, in FIGS. 2 and 7 to read the presence of displaced bubbles as the card travels endwise in the slot. Box 33 represents a circuit connected with the detectors 32 connected to convert the detector signals corresponding to displaced bubbles into other signals such as numbers on a display seen by the clerk to enable assembly of the correct numbers of selected items. The reader and detector can take many different forms. FIG. 9 shows a selected bubble during reading, with parallel incident light rays 140 reflected convergently at **140*a* toward a reader sensor 142. The crests of the bubbles may be colored or darkened to better reflect light, and also enable the user to better view the bubbles during selection. See darkened "dots" 160. FIG. 10 shows a non-selected bubble during reading, with parallel incident light rays 140 reflected divergently and therefore not sensed at a threshold level, by the sensor. Associated with corners of the card of FIGS. 6–8 are means (bevels, of different angularity, or that are detectable by the sensor apparatus to orient the sensor circuitry to the card orientation, as inserted into the sensor. Thus, either end of the card may be inserted into the sensor, and the card may face up or down. See bevels 82 and 83**.

Also provided is a means responsive to overcenter bubble displacement to visually quickly indicate the state of such displacement. Examples are:

(i) visible relative displacement of lines or dots, etc., on the bubble surface. See for example dots 210 inscribed on the bubble surface 211 in FIG. 4, and which separate further apart (210') in displaced bubble position 22';

(ii) a "checker" shaped design on the bubble surface that becomes warped due to bubble displacement;

(iii) a change in color or opacity of the bubble surface due to its displacement. Plastic materials are known, which produce this effect due to a change in stress in the plastic.

FIGS. 11 and **11*a* show front and back faces an 172 of a further modified card 170. Edges of the rectangular card include longitudinally spaced, laterally extending edges 173 and 174, and laterally spaced, longitudinally elongated edges 175 and 176. The card bears certain indicia 177 on front face 171, and other indicia 178 on rear face 172. Such indicia typically extend vertically at the center regions of the card faces, as shown. The indicia may be printed on paper labels 177*a* and 178*a* bonded to the card front face at the card center flat region 180, seen in FIG. 12**. The card itself typically consists of plastic material, such as polystyrene, or other flexible material. Card thickness is between about 0.003 and 0.009 inches, as referred to above.

Each row of indicia indicates an item of merchandise (or product), (or some quality of merchandise) to be selected, and/or terms of payment, or other information regarding a product or item. See the representative items listed on the two labels.

Figure 11A:
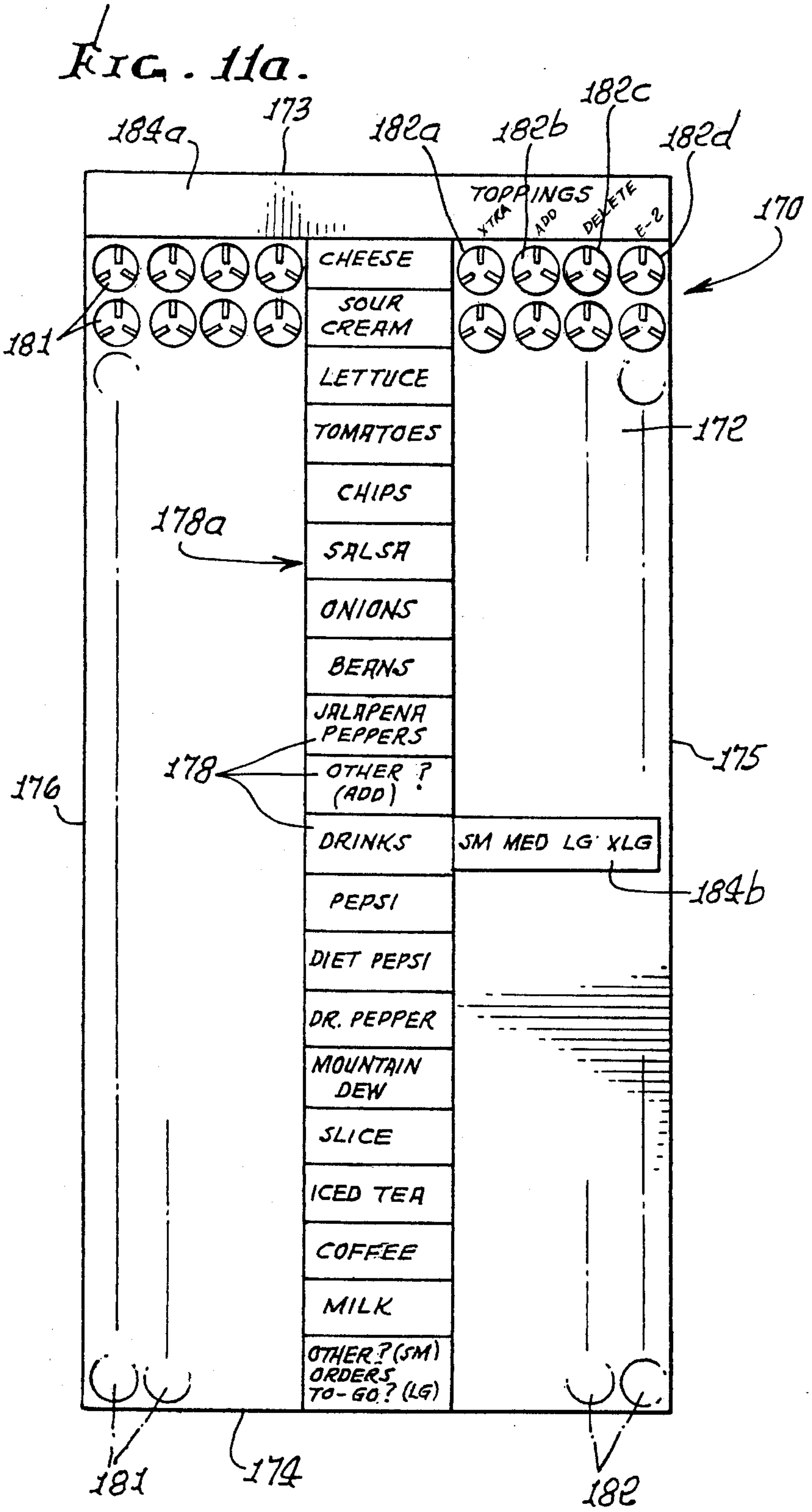

Certain bubbles 181 integral with the card material are located on the card to the right of the indicia 177 at the front of the card in FIG. 11; and other bubbles 182 are located to the right of the indicia 178 at the rear of the card; thus, bubbles 182 are to the left of the indicia 177 in FIG. 11, and bubbles 181 are to the left of indicia 178 at card side 172. The bubbles have positions on the card representative of items or numbers of items to be selected. The closely packed "certain" bubbles 181 are located in four columns **181*a*–181*d*, corresponding for example to 1, 2, 3, or more items (for example entrees) to be selected, as shown by the horizontal label 184 at the top of the card. Similarily, there are four columns of the "other" bubbles 182, indicated at 182*a*–182*d*. See also labels 184*a* and 184*b* in FIG. 11*a***.

Bubbles 181 have first stable positions projecting (i.e. dome-shaped) downwardly from the plane of the card, as represented by the flat region 180 in FIG. 12; and bubbles 182 have first stable positions projecting (i.e. dome-shaped) upwardly from the plane of the card when viewed looking toward face 171 in FIG. 11. See also FIG. 13.

Bubbles 181 have second position (see FIG. 15 for example) into which are displaced relative to the plane of the card as by upward finger pressure in FIG. 11, to indicate selection of items 177 (and numbers thereof) corresponding to bubble positions on the card. Similarly, when the card is turned over for viewing of indicia 178 in FIG. 11*a*, bubbles 182 have second positions (corresponding to FIG. 15), as when they are upwardly displaced by finger pressure exerted upwardly in FIG. 11*a* to indicate selection of items 178 corresponding to bubble positions on the card.

In accordance with an important aspect of the invention, the bubbles have integral local ribbing acting to stiffen the displaced bubbles for resisting return thereof to their first (i.e. undisplaced) positions. Such stiffening, for example, resists complete inverting of the bubbles, and results in bubble displacement as seen in FIG. 15, i.e. generally into the plane of the card, where the bubbles assume a "wrinkled" formation. This resists unwanted bubble snap-back to original position during the time that normally bubbles are being displaced, and during card "reading" as in FIG. 16.

One highly advantageous form of ribbing comprises the Y-shaped ribs 190–192 on each bubble. Such ribs are generally radial and linear, and project at the inner sides of the bubbles as seen in FIGS. 13 and 14. The ribs terminate short of the bubble crests 193, which are left free of protrusions for ease and accuracy of bubble reading, as referred to above. The ribs 190–192 project to the circumference of each bubble, and it is found that when the bubbles are displaced or deflected as in FIG. 15, an annular rib 196 forms and stands out at that circumference, which further stiffens the bubble. The bubble typically takes the wrinkled shape seen in FIG. 15, when displaced as referred to.

Accordingly, the invention enables ease and accuracy of bubble selection and displacement, with bubble retention in displaced position until forcibly returned to original position, after card automatic reading as referred to above, and such reading is facilitated by the unribbed bubble crests that reflect light, as referred to.

The radial dimensions of the ribs are indicated at $\Delta_1$, in FIG. 13, wherein the bubble radius from its central axis 197 is indicated at $\Delta_2$, where $\Delta_2 > \Delta_1$. Card 170 and bubbles 181 and 182 are typically non-transparent.

Ribbing on the bubbles also contributes to:

(a) reduction of force required to "detent" the bubbles;

(b) reduction of the amount of "crosstalk" between the bubbles, during use.

The ribbing may take various forms or patterns.

I claim:

1. A menu device, comprising
(a) a card,
(b) indicia on the card listing items to be selected,
(c) bubbles on the card and in special correspondence with said indicia, the bubbles having positions on the card representative of items to be selected,
(d) the bubbles having first positions projecting in one direction outwardly from the plane of the card, and second positions into which they are displaced relative to the plane of the card, by finger pressure, to indicate selection of items corresponding to bubble positions on the card,
(e) and said bubbles having integral local ribbing acting to stiffen the displaced bubbles for resisting return thereof to said first positions.

2. The device of claim 1 wherein said bubbles have crests, and said ribbing is offset from said crests.

3. The device of claim 1 wherein the card consists of molded synthetic resinous material.

4. The device of claim 2 wherein said ribbing on each of said bubbles extends toward said crests.

5. The device of claim 3 wherein said ribbing on each of said bubbles extends generally linearly toward said crests.

6. The device of claim 3 wherein said bubbles are dome shaped and have central axis, said ribbing on each of said bubbles including multiple ribs spaced apart about the bubble axis.

7. The device of claim 6 wherein said ribs are spaced apart at equal angle, about said axis.

8. The device of claim 7 wherein there are at least three ribs on each of said bubbles, with Y shape.

9. The device of claim 1 wherein the card extends laterally and longitudinally, certain bubbles extend at one lateral side of the indicia, and other bubbles extend at the opposite lateral side of the indicia, the certain bubbles domed downwardly, and the other bubbles domed upwardly.

10. The device of claim 1 wherein the card has opposite faces, the indicia including certain indicia readable at one face of the card and other indicia readable at the opposite face of the card, and wherein certain bubbles associated with said certain indicia are domed downwardly relative to said one face, and wherein other bubbles associated with said other indicia are domed downwardly relative to said opposite face.

11. The device of claim 10 wherein said certain bubbles extend in rows and columns, and said other bubbles also extend in rows or columns.

12. The device of claim 11 wherein said bubbles have crests, and said ribbing is offset from said crests.

13. The device of claim 12 wherein said ribbing on each of said bubbles extends toward said crests.

14. A menu device, comprising
(a) a card,
(b) indicia on the card listing items to be selected,
(c) bubbles on the card and in spacial correspondence with said indicia, the bubbles having positions on the card representative of items to be selected,
(d) the bubbles having first positions projecting in one direction outwardly from the plane of the card, and second positions into which they are displaced relative to the plane of the card, by finger pressure, to indicate selection of items corresponding to bubble positions on the card,
(e) the card extending laterally and longitudinally, certain bubbles extending at one lateral side of the indicia, and other bubbles extend at the opposite lateral side of the indicia, the certain bubbles domed downwardly, and the other bubbles domed upwardly,
(f) the bubbles having means associated therewith acting to stiffen the displaced bubbles for resisting return thereof to said first position.

15. The device of claim 14 wherein the card has opposite faces, the indicia including certain indicia readable at one face of the card and other indicia readable at the opposite face of the card, and wherein certain bubbles associated with said certain indicia are domed downwardly relative to said one face, and wherein other bubbles associated with said other indicia are domed downwardly relative to said opposite face.

16. The device of claim 1 wherein bubbles are arranged in at least one longitudinal column.

17. The device of claim 16 wherein the indicia are arranged in a column parallel to the bubble column, and including a label on the card carrying the indicia.

18. The device of claim 17 wherein the bubbles are in columns at opposite sides of the indicia, the bubbles at the right side of the indicia domed downwardly, and the bubbles at the left side of the indicia domed upwardly.

19. The device of claim 1 wherein the bubbles are unitary with the card.

20. The device of claim 19 wherein the bubbles are of substantially the same diameter, which is less than about ½ inch.

21. The device of claim 19 wherein the bubbles have diameter between 3/16 and ⅜ inch.

22. The device of claim 19 wherein the bubbles have thickness of between 0.003 and 0.008 inch.

23. The device of claim 18 wherein the bubbles at each side of the indicia are arranged in four columns.

24. The device of claim 1 including means forming a card receiving opening into which the card and bubbles thereon are removably received, with certain selected bubbles displaced as referred to, for detecting which of the bubbles are so displaced.

25. The device of claim 15 and including:

(i) visually reading said indicia to determine which of said items are to be selected, (ii) and manually upwardly displacing a selected bubble or bubbles in alignment with selected said items, the selected bubble or bubbles corresponding to the desired selected item or items.

26. The device of claim 25 wherein bubbles during said reading project away from a plane defined by the card, and away from the reader, and said displacing is carried out to displace the bubble or bubbles toward the reader.

27. The device of claim 25 including detecting which bubble has been displaced in order to fill the order for said items.

28. The device of claim 27 including returning the bubbles to initial position as orders for selected items are filled.

* * * * *